(12) United States Patent
Hara

(10) Patent No.: US 9,232,008 B2
(45) Date of Patent: Jan. 5, 2016

(54) NAVIGATION DATA SHARING SYSTEM AND NAVIGATION INSTRUMENT

(75) Inventor: Yuichi Hara, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 177 days.

(21) Appl. No.: 13/167,768

(22) Filed: Jun. 24, 2011

(65) Prior Publication Data

US 2011/0319750 A1 Dec. 29, 2011

(30) Foreign Application Priority Data

Jun. 25, 2010 (JP) ................................. 2010-145001

(51) Int. Cl.
*G06F 15/16* (2006.01)
*G08G 1/123* (2006.01)
*G06F 7/00* (2006.01)
*H04L 29/08* (2006.01)
*G08G 3/00* (2006.01)
*G01C 21/00* (2006.01)

(52) U.S. Cl.
CPC ................ *H04L 67/12* (2013.01); *G01C 21/00* (2013.01); *G08G 3/00* (2013.01)

(58) Field of Classification Search
None
See application file for complete search history.

(56) References Cited

U.S. PATENT DOCUMENTS

| | | | | |
|---|---|---|---|---|
| 4,914,598 A | * | 4/1990 | Krogmann et al. | 701/11 |
| 5,184,304 A | * | 2/1993 | Huddle | 701/510 |
| 5,297,052 A | * | 3/1994 | McIntyre et al. | 701/502 |
| 5,719,764 A | * | 2/1998 | McClary | 700/79 |
| 6,445,983 B1 | * | 9/2002 | Dickson et al. | 701/23 |
| 7,706,305 B2 | | 4/2010 | Ninomiya et al. | |
| 8,090,784 B2 | * | 1/2012 | Asahara | 709/206 |
| 8,204,635 B2 | * | 6/2012 | Manfred et al. | 701/4 |
| 8,565,109 B1 | * | 10/2013 | Poovendran et al. | 370/252 |
| 2009/0037525 A1 | | 2/2009 | Asahara | |
| 2010/0198718 A1 | * | 8/2010 | Morosan et al. | 705/37 |
| 2011/0040430 A1 | * | 2/2011 | Tessier | 701/3 |

FOREIGN PATENT DOCUMENTS

| | | |
|---|---|---|
| CN | 201227489 A | 7/2008 |
| JP | 2009-38503 A | 2/2009 |
| JP | 2009-58246 A | 3/2009 |

OTHER PUBLICATIONS

1st Office Action of the corresponding Chinese Patent Application No. 201110165406.1, dated Apr. 28, 2015.

* cited by examiner

*Primary Examiner* — Helal A Algahaim
*Assistant Examiner* — Paul Castro
(74) *Attorney, Agent, or Firm* — Global IP Counselors, LLP

(57) ABSTRACT

A navigation system includes two or more navigation instruments connected with a network, and two or more sensors connected with the network and for detecting information to be used by the navigation instruments. The navigation instrument includes a switch control module for switching between a state in which the navigation instrument functions as a mother unit and as a child unit, a delivery module for transmitting through the network, when one of the navigation instruments functions as the mother unit, representative sensor selection related information to another navigation instrument that functions, the representative sensor selection related information being information about which sensor is to be used among the two or more sensors, and a representative sensor selecting module for selecting the sensor to be used based on the representative sensor selection related information received from the navigation instrument that functions as the mother unit.

18 Claims, 3 Drawing Sheets

NAVIGATION DATA SHARING SYSTEM AND NAVIGATION INSTRUMENT

CROSS-REFERENCE TO RELATED APPLICATION(S)

The application claims priority under 35 U.S.C. §119 to Japanese Patent Application No. 2010-145001, which was filed on Jun. 25, 2010, the entire disclosure of which is hereby incorporated by reference.

TECHNICAL FIELD

The present invention relates mainly to a navigation data sharing system that shares navigation data among two or more navigation instruments, and to such a navigation instrument.

BACKGROUND

Typically, various kinds of sensors and navigation instruments including a radar, a fishfinder, and a GPS receiver are carried in a ship. In many cases, these devices are interconnected through network(s) including a Local Area Network to establish a network system. JP2009-58246A discloses this kind of network system for the ship instruments.

The ship instrument network system disclosed in JP2009-58246A includes, as its main components, a server device having a server function, two or more sensors for detecting the same physical property, and two or more display units for displaying the data detected by these sensors.

The server device selects one from two or more sensors, and shares the detection value of this selected sensor among the two or more display units. Particularly, the ship instrument network system has two or more communication networks, and the detection value of the sensor can be shared among the two or more communication networks.

In the network system of JP2009-58246A, the sharing of data is performed by instructions only from the server device having the server function. Therefore, when a failure occurs in this server device, this single failure can easily make the sharing of the sensor detection value impossible. Thus, there is a need for an improvement in this regard.

In addition, since, in the network system of JP2009-58246A, the communication network to which the server device is directly connected and the communication network to which the sensors are directly connected are separate networks, the network system may also have the following disadvantage.

The disadvantage is that the detection value of the sensor needs to pass through a network instrument which connects the different communication networks, which creates a time lag in the transmission. Moreover, when a failure occurs in the network instrument, the system cannot use the sensor and the like connected with this network instrument.

SUMMARY

The present invention is made in view of the above situations, and provides a navigation data sharing system that has a large tolerance to an failure or failures, and also provides a navigation instrument that shares the navigation data with another navigation instrument in the navigation data sharing system.

According to one aspect of the invention, a navigation data sharing system is provided, which includes two or more navigation instruments connected with a network, and two or more sensors connected with the network and for detecting information to be used by the navigation instruments. The navigation instrument includes a switch control module for switching between a state in which the navigation instrument functions as a mother unit and a state in which the navigation instrument functions as a child unit, a delivery module for transmitting through the network, when one of the navigation instruments functions as the mother unit, representative sensor selection related information to another navigation instrument that functions as the child unit, the representative sensor selection related information being information about which sensor is to be used among the two or more sensors, and a representative sensor selecting module for selecting, when one of the navigation instruments functions as the child unit, the sensor to be used, based on the representative sensor selection related information received from the navigation instrument that functions as the mother unit, only one of the navigation instruments functioning as the mother unit.

Thereby, the same navigation data can be used (shared) among all the navigation instruments. Moreover, since the navigation instrument which functions as the mother unit can be switched, even if a failure occurs to the navigation instrument which functions as the mother unit, the sharing of the navigation data can be maintained by operating another navigation instrument as the mother unit.

The navigation instrument may use an algorithm as the representative sensor selection related information for selecting the sensor to be used.

Thereby, since the navigation instrument which functions as the mother unit and the navigation instrument which functions as the child unit use the sensor which is selected by using the same algorithm, the same navigation data can be used among the instruments. Moreover, the navigation instrument which functions as the child unit can select a suitable sensor by using the latest algorithm which is received from the mother unit, even when a failure occurs in the connection between the navigation instruments.

The navigation instrument may use information that specifies the sensor to be used, as the representative sensor selection related information.

Thereby, compared with the conventional method, the size of the transmitting data can be reduced. Moreover, since the navigation instrument which functions as the child unit does not perform processing for selecting the representative sensor, the computational complexity can be reduced.

In the navigation data sharing system, at least two sensors among the two or more sensors may detect the same physical property.

Thereby, even if the detection accuracy of a certain sensor falls, another sensor for detecting the same physical property can be used instead of the failed sensor. Therefore, an extremely stable system which is utilized with accurate navigation data can be achieved.

The delivery module provided to the navigation instrument that functions as the mother unit may transmit the representative sensor selection related information to the navigation instrument that functions as the child unit when the representative sensor selection related information is updated.

Thereby, if a setting of the navigation instrument which functions as the mother unit is changed, this change can be reflected in the navigation instrument which functions as the child unit.

The navigation data sharing system may further include a navigation data converting device. The navigation data converting device may include a first access module connected with the network, a second access module to which a device which cannot directly be connected with the network is connected, and the representative sensor selecting module for selecting the sensor to be used by a device connected to the second access module, based on the representative sensor selection related information received from the navigation instrument that functions as the mother unit.

Thereby, when a device connected with the second access module can use the navigation data, the navigation data of the sensor selected by the representative sensor selecting module of the navigation data converting device can be used in the device. That is, the navigation data can be shared between the navigation instrument connected with the network and the device which cannot directly be connected with the network. Therefore, if using a sensor as the device connected with the second access module, the navigation instrument connected with the network can use this sensor.

The navigation instrument may be a ship navigation instrument.

Typically, in a ship, a number of sensors and navigation instruments are connected, and the navigation data detected by the sensors is used by a number of navigation instruments. Therefore, the effects of this aspect of the present invention can be demonstrated especially effectively in this application.

According to another aspect of the invention, a navigation instrument is provided, which includes a switch control module for switching between a state in which the navigation instrument functions as a mother unit and a state in which the navigation instrument functions as a child unit, a representative sensor selecting module for selecting a sensor to be used based on representative sensor selection related information that is information about which sensor is to be used among sensors connected to the navigation instrument through a network, and a delivery module for transmitting, when navigation instrument functions as the mother unit, the representative sensor selection related information through the network to another navigation instrument that functions as the child unit.

Thereby, the navigation data which one navigation instrument uses can also be used in another navigation instrument. Moreover, since the mother unit and the child unit can be switched, the network which can continue sharing the navigation data even if a failure occurs in one navigation instrument can be established.

The representative sensor selecting module may select the sensor to be used based on the transmitted representative sensor selection related information when the navigation instrument functions as the child unit.

Thereby, the navigation instrument which function as the child unit can use the same navigation data as the navigation instrument which functions as the mother unit.

The navigation instrument may be used in a ship.

Typically, in a ship, a number of sensors and navigation instruments are connected, and the navigation data detected by the sensors is used by a number of navigation instruments. Therefore, the effects of this aspect of the present invention can be demonstrated especially effectively in this application.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
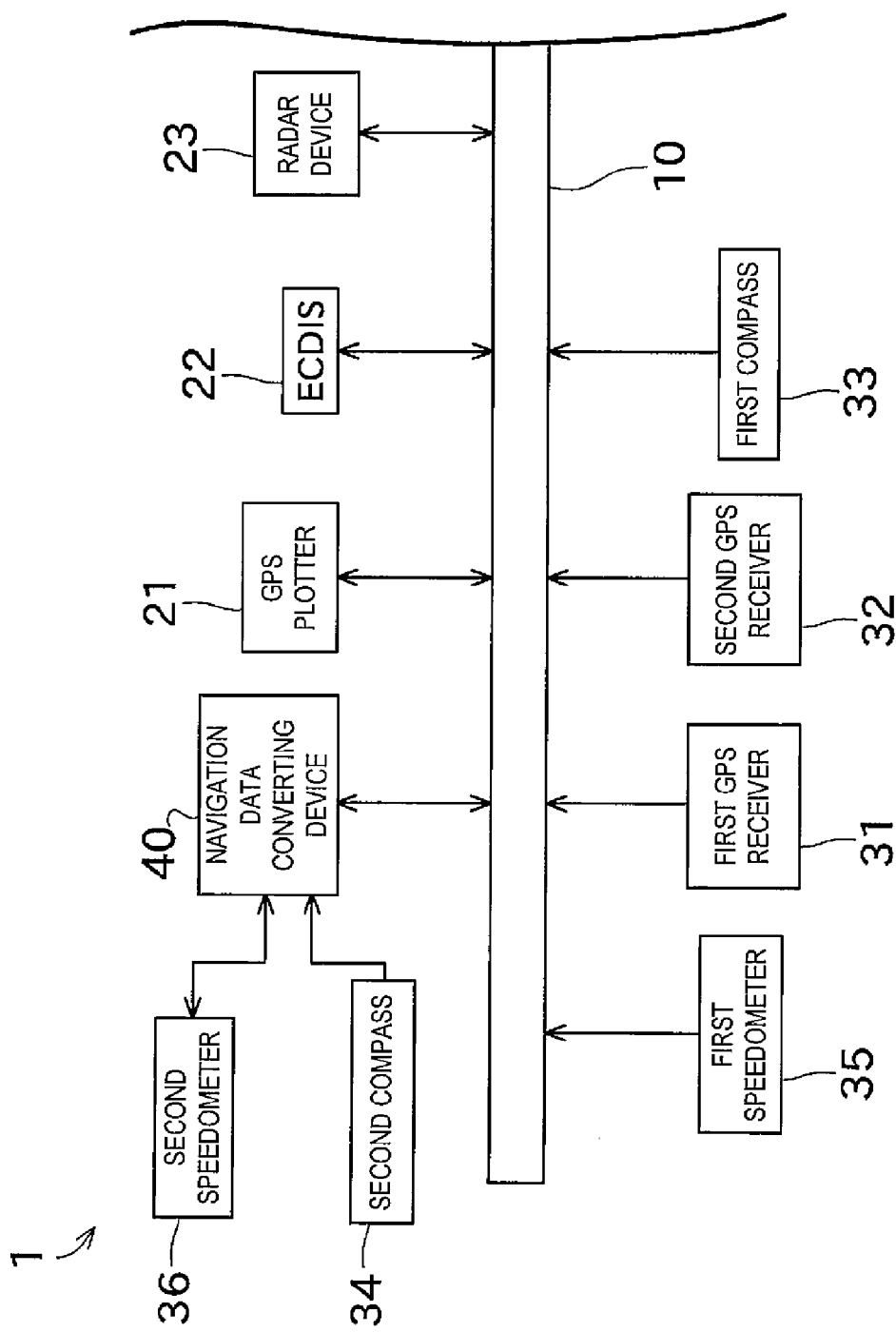
FIG. 1 is a block diagram showing an overall configuration of a navigation data sharing system according to one embodiment of the present invention.

Hereinafter, one embodiment of the invention is described with reference to the accompanying drawings. FIG. 1 is a block diagram showing an overall configuration of a navigation data sharing system according to this embodiment of the present invention.

As shown in FIG. 1, the navigation data sharing system 1 are established in a ship and includes a wired LAN (Local Area Network or, simply, a network) 10 which enables mutual communication between instruments. The navigation data sharing system 1 is constructed as a system where various sensors, navigation instruments and the like are connected with the LAN 10. Note that the network of the navigation data sharing system 1 is not limited to the LAN described above, but other various networks may be applied to the navigation data sharing system 1.

Each sensor detects information to be used by the navigation instruments and outputs the detected information to the navigation instruments as navigation data. In this embodiment, the navigation data sharing system 1 can use (share) the same navigation data among the navigation instruments which use the navigation data. Hereinafter, the sensors, the navigation instruments and the like which are connected with the navigation data sharing system 1 are described in details.

As shown in FIG. 1, the navigation data sharing system 1 includes, as the sensors, a first GPS receiver 31, a second GPS receiver 32, a first compass 33, a second compass 34, a first speedometer 35, and a second speedometer 36, which are connected with the navigation data sharing system 1. In addition, the navigation data sharing system 1 also includes, as the navigation instruments, a GPS plotter 21, an ECDIS (Electronic Chart Display and Information System) 22, and a radar device 23, which are connected with the navigation data sharing system 1. In addition, a navigation data converting device 40 is connected with the navigation data sharing system 1 other than the above.

The first GPS receiver 31 and the second GPS receiver 32 receive positioning signals from GPS antennas (not illustrated) and detect current positional information including the position of the ship concerned (particularly, the position of the first GPS receiver 31 or the second GPS receiver 32). The first GPS receiver 31 and the second GPS receiver 32 are configured connectable with the LAN 10.

The first compass 33 includes two or more GPS antennas fixed to the ship concerned, and can detect a bow azimuth direction based on a relative spatial relationship of the GPS antennas. Moreover, the first compass 33 is configured connectable with the LAN 10.

The second compass 34 utilizes a gyroscope to detect the bow azimuth direction. For this reason, the azimuth direction detected by the second compass 34 is not influenced by geomagnetism. Note that the second compass 34 of this embodiment cannot be directly connected with the LAN 10 but is connected with the LAN 10 via the navigation data converting device 40 which will be described in detail below.

The first speedometer 35 and the second speedometer 36 detect a traveling speed of the ship concerned (ground speed) which equips the system of this embodiment. The positional information of the ship concerned is inputted into the first speedometer 35 and the second speedometer 36 from the first GPS receiver 31 or the second GPS receiver 32. In addition, the first speedometer 35 and the second speedometer 36 acquire time information from a clock which is provided in each speedometer or a clock provided to another instrument. The first speedometer 35 and the second speedometer 36 calculate the ground ship speeds by calculating how much the ship position changes within a predetermined time interval. The first speedometer 35 is directly connected with the LAN 10. On the other hand, the second speedometer 36 cannot be directly connected with the LAN 10 but is connected with the LAN 10 via the navigation data converting device 40 (again, described later).

The ground ship speeds calculated by the first speedometer 35 and the second speedometer 36 are displayed on an instrument such as the ECDIS 22. The sensor in this specification also include, like the first speedometer 35 and the second speedometer 36, those which output the navigation data and use the navigation data outputted from another sensor.

In this embodiment, two or more sensors which detect the same physical property are connected with the navigation data sharing system 1, as described above. Specifically, both the first GPS receiver 31 and the second GPS receiver 32 detect the positions of the ship concerned. Moreover, although the first compass 33 and the second compass 34 use different detecting methods but both detect the bow azimuth directions. The first speedometer 35 and the second speedometer 36 both detect the ground ship speeds. Note that, in the following description, the sensors which detect the same physical property may be generically referred to as a "sensor group of the same kind."

The GPS plotter 21 displays the position of the ship concerned on a map displayed as a screen image based on the positional information acquired from the first GPS receiver 31 or the second GPS receiver 32. The GPS plotter 21 also draws a trace line indicating the movement of the ship concerned, and stores symbols marked on the screen map to show (plot) specific locations. The GPS plotter 21 is configured connectable with the LAN 10.

The ECDIS (Electronic Chart Display and Information System) 22 acquires the position of the ship concerned from the first GPS receiver 31 or the second GPS receiver 32, and automatically displays a nautical chart around the ship concerned as a screen image based on electronic nautical chart information which is prepared beforehand.

In addition to the nautical chart information, the ECDIS 22 displays various kinds of additional information on the screen to assist a ship operator in route planning and cruise surveillance. The additional information includes target object data outputted from the radar device 23 (specifically, the positions of other ships cruising the nearby area, etc.), and the ground ship speed outputted from the first speedometer 35 or the second speedometer 36. The ECDIS 22 is configured connectable with the LAN 10.

The radar device 23 transmits microwaves through a rotating antenna, receives corresponding reflection waves from target object(s), and performs a suitable calculation to the reflection to detect the position of each target object. Moreover, the radar device 23 acquires positional information on other ships (AIS information) from AISs (Automatic Identification Systems) which are typically equipped on every ship (the AIS of the ship concerned is not illustrated), and displays it with symbols of the target objects (i.e., other ships). The radar device 23 is configured connectable with the LAN 10.

The navigation data converting device 40 is connected with the second compass 34 and the second speedometer 36 which cannot be directly connected with the LAN 10, and relays the navigation data outputted from the second compass 34 and the second speedometer 36. The navigation data converting device 40 also acquires the navigation data which is needed for the second speedometer 36 from the LAN 10.

Figure 2:
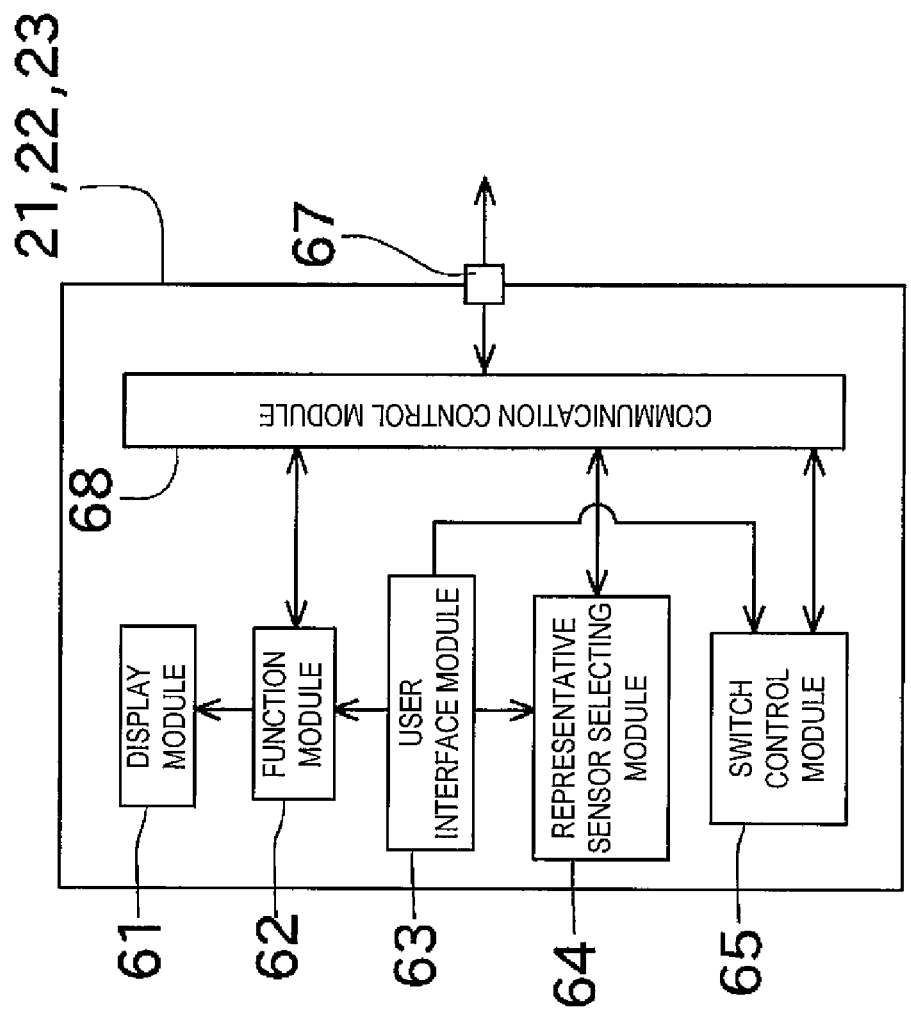
FIG. 2 is a block diagram showing a configuration of each navigation instrument shown in FIG. 1.

Next, the configuration of the navigation instrument in order to share the navigation data is described with reference to FIG. 2. FIG. 2 is a block diagram showing the configuration of the GPS plotter 21, the ECDIS 22, or the radar device 23, as the navigation instrument.

First, the configuration of sharing the navigation data to be used is briefly described. In the navigation data sharing system 1 of this embodiment, the navigation instrument functions as a mother unit or its child unit. In this navigation data sharing system 1, there is one navigation instrument which functions as the mother unit, and other navigation instruments function as the child units. Moreover, an instrument which always functions as the child unit (the navigation data converting device 40) is also connected with the navigation data sharing system 1. The mother unit and the child units each contains an algorithm for determining (selecting) a sensor to be used (representative sensor) from a sensor group of the same kind (representative sensor selection related information) to select the representative sensor according to this algorithm. The algorithm of the mother unit is always matched to the algorithm of the child unit, or vice versa, thus the representative sensors selected by the mother unit and the child unit are always the same. As a result, the navigation data to be used can always be shared. Note that, in the following description, the "navigation instrument that functions as the mother unit" may simply be referred to as the "mother unit," and the "navigation instrument that functions as the "child units" may simply be referred to as the "child unit."

As shown in FIG. 2, the navigation instrument includes a display module 61, a function module 62, a user interface module 63, a representative sensor selecting module 64, a switch control module 65, a communication control module 68 (delivery module), and a LAN access module 67. The function module 62 is a module which functions as the navigation instrument. Specifically, the function module 62 of the GPS plotter 21 has a function to draw the trace line indicating the movement of the ship concerned. The function module 62 of the ECDIS 22 has a function to automatically display the nautical chart around the ship concerned on the screen. The function module 62 of the radar device 23 has a function to receive the reflection wave from the target object and perform the suitable calculation for the reflection to detect the position of the target object. Note that the radar device 23 may function as a sensor for outputting the target object data detected by the radar device 23 (specifically, the position of another ship cruising the nearby area) to the GPS plotter 21 or the ECDIS 22.

Moreover, the navigation instrument can exchange various data through the LAN 10 or, the LAN 10 and the LAN access module 67. For example, the navigation instrument may acquire an ID and an IP address of the navigation instrument or the sensor which is newly connected with the navigation data sharing system 1; or it may acquire the navigation data outputted from the sensor; or it may transmit or deliver the algorithm when this navigation instrument concerned functions as the mother unit. The data received from other navigation instruments and sensors are first received by the communication control module 68. Then, the communication control module 68 appropriately outputs this data to each component of this instrument. For example, the communication control module 68 outputs the navigation data of the representative sensor to the function module 62, or outputs data required for the selection of the representative sensor to the representative sensor selecting module 64.

The representative sensor selecting module 64 selects the representative sensor from the sensor group of the same kind based on the algorithm. Although there are various kinds of algorithms which the representative sensor selecting module 64 uses, algorithms based on the following methods can be used, for example.

As a simple method, a priority is set in advance to each sensor and the representative sensor is selected according to the priority. That is, the sensor with the highest priority is normally selected as the representative sensor, and if the navigation data cannot be acquired from this representative sensor for more than a predetermined period of time, the sensor with the next highest priority is selected as the representative sensor.

Alternatively, the representative sensor selecting module 64 acquires the navigation data from all the sensors of the same kind through the communication control module 68. Then, the representative sensor selecting module 64 calculates an average value of two or more navigation data acquired from the sensors, and selects navigation data with the least deviation from the calculated average value. Then, the sensor which outputted the selected navigation data is selected as the representative sensor. Note that, when using this algorithm, the navigation data needs to be acquired from at least three sensors because if there are only two navigation data, since the deviations from the average value become equal to each other.

Alternatively, the following method may be used by combining the method of setting the priority and the method of detecting the deviations from the average value described above. That is, the sensor with the highest priority is generally selected as the representative sensor. If the deviation of the current representative sensor from the average value exceeds the predetermined threshold, the sensor with the highest priority among other sensors of which deviations are below the threshold is selected as the representative sensor.

Alternatively, any other suitable methods may also be used other than those described above as the algorithm for selecting the representative sensor. Two or more algorithms described above may be selectively used according to a situation. In this embodiment, the mother unit and the child units perform the selection of the representative sensor at a predetermined time interval, and the function module 62 uses the navigation data of the selected representative sensor to perform various kinds of processes.

The selection of the representative sensor is performed per sensor group with the same detection property. For example, when the ECDIS 22 uses the navigation data of both the positional information of the ship concerned and the bow azimuth direction, the ECDIS 22 individually performs the selection of the representative sensor for detecting the positional information of the ship concerned to be used and the selection of the representative sensor for choosing the bow azimuth direction to be used.

Alternatively, as the representative sensor selection related information which the mother unit transmits to the child units, the mother unit may transmit information which specifies not the algorithm but the representative sensor. Also in this case, the mother unit selects the representative sensor by any of the above-mentioned algorithms. Then, the mother unit transmits the ID or IP address of the selected representative sensor to the child units. The child units use the navigation data from the representative sensor based on the received ID or IP address.

Alternatively, the selection of the algorithm to be used by the representative sensor selecting module 64 and the setting of the threshold for the deviations may be performed by operating the user interface module 63 according to the indication of the display module 61. In this embodiment, the algorithm to be used by the representative sensor selecting module 64 of the mother unit is updated and, at the same time, the updated algorithm is delivered to the representative sensor selecting modules 64 and 44 of the child units. Thereby, since the same algorithm is always used between the mother unit and the child units, the same sensor is selected as their representative sensors. Therefore, the redundancy can be secured by using the two or more sensors, and these sensors which are generation sources of the navigation data to be used are unified among the two or more navigation instruments. Thereby, the operational consistency of the navigation instruments can be maintained throughout the system.

Note that, other than the case where the algorithm to be used by the representative sensor selecting module 64 of the mother unit is updated, the mother unit and the child unit perform communication with each other, such as transmission and reception of communication check signals, etc. By this communication check, if the child unit recognizes that the communication between the child unit and the mother unit is not possible but when required navigation data has been acquired by the child unit, the child unit selects the representative sensor and acquires the navigation data based on the latest algorithm which the child unit currently holds. In this case, an indication of the child unit "possibly used the algorithm which is different from the algorithm which the mother unit uses" (or possibly operating based on the navigation data of the sensor which is different from the navigation data which the mother unit uses) on the display module 61.

The switch control module 65 controls itself whether to switch this navigation instrument concerned to function as the mother unit or the child unit. Normally, the navigation instrument which functions as the mother unit does not change. However, when the user performs a certain input through the user interface module 63, or when the navigation instrument which functions as the mother unit becomes impossible to connect with the LAN 10, the switch control module 63 controls the navigation instruments so that between the mother unit and the child unit are switched.

For example, assuming a situation where the GPS plotter 21 has been operating as the mother unit but the ECDIS 22 now needs to operate as a mother unit to carry out maintenance of the GPS plotter 21. In this case, the user operates the user interface module 63 of the GPS plotter 21 to execute a suitable instruction. By this instruction, the switch control module 65 of the GPS plotter 21 informs of the switching to the ECDIS 22 which will function as the mother unit next. Then, at a suitable timing which is set in advance, the navigation instrument which functions as the mother unit is switched from the GPS plotter 21 to the ECDIS 22. Then, the ECDIS 22 informs the child units (the GPS plotter 21, the radar device 23, and the navigation data converting device 40) about the fact that the navigation instrument which functions as the mother unit has been switched.

Assuming another situation, when the GPS plotter 21 has been operating as the mother unit but the GPS plotter 21 is failed, the navigation instrument which operates as the mother unit is switched as follows. For example, the priorities are assigned in advance to the navigation instruments which are able to operate as the mother unit and, here, assuming that the navigation instrument with the highest priority is the GPS plotter 21 and the navigation instrument with the second highest priority is the ECDIS 22.

In this case, the ECDIS 22 transmits the communication check signal at every predetermined time interval to the GPS plotter 21. The GPS plotter 21 normally replies (responds) to this communication check signal. However, if the GPS plotter 21 or the ECDIS 22 are failed (or if the connection is poor), the ECDIS 22 cannot receive the reply to the communication check signal.

Then, when the communication check signal cannot be received for more than the predetermined time and when the connection of the navigation instrument concerned is normal, the ECDIS 22 determines that the GPS plotter 21 is failed. Then, the switch control module 65 of the ECDIS 22 operates the navigation instrument concerned (i.e., in this case, the ECDIS 22) as the mother unit. Then, the ECDIS 22 transmits to the child units the fact that the navigation instrument which functions as the mother unit has been changed.

By performing the above examples of processes, the navigation instrument which functions as the mother unit can be switched. Moreover, the navigation instrument which functions as the mother unit may also be switched by processes other than the above.

Figure 3:
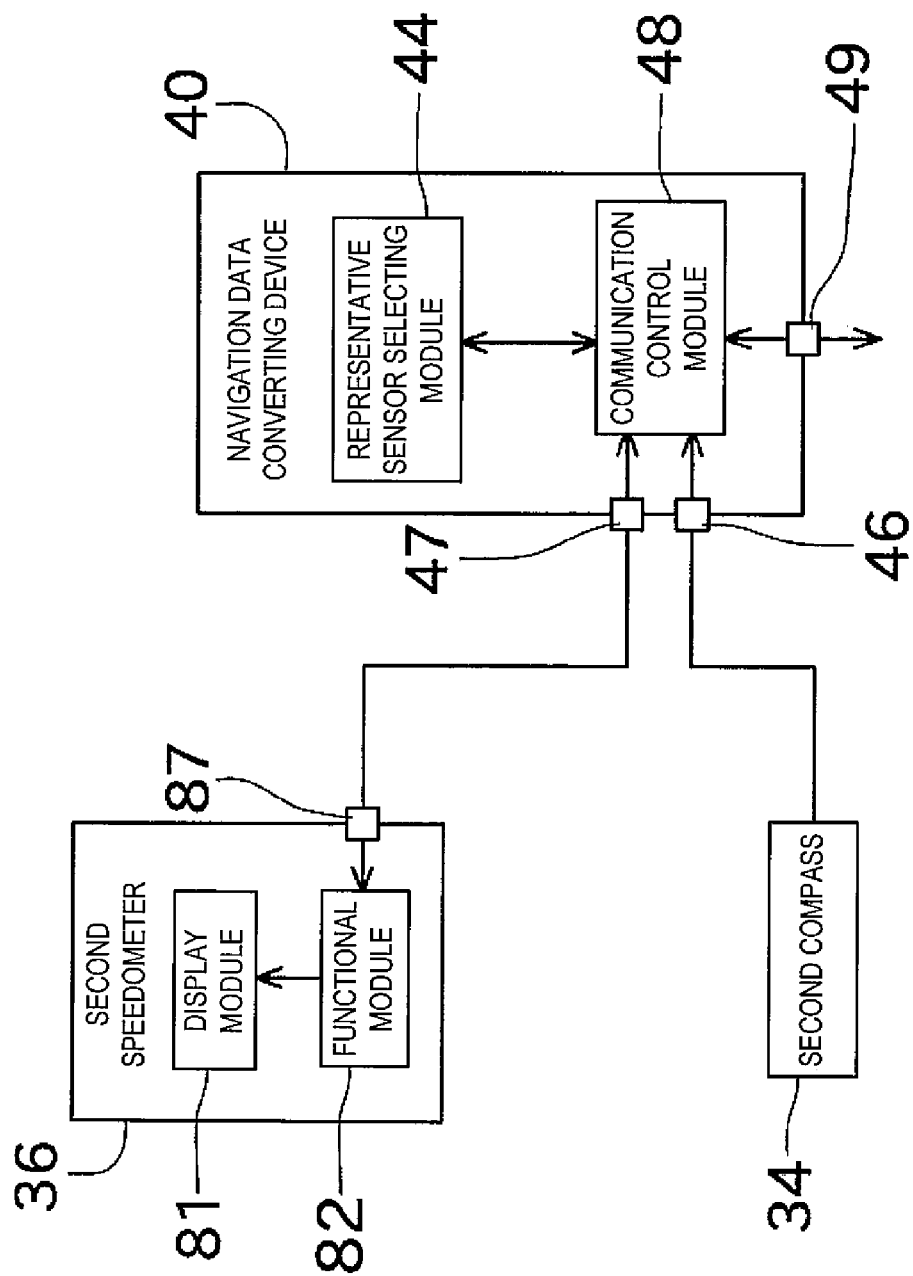
FIG. 3 is a block diagram illustrating a function of a navigation data converting device.

Next, the configuration in which the second compass 34 and the second speedometer 36 which do not directly connect with the LAN 10 function as the constituent elements of the navigation data sharing system 1 is described with reference to FIG. 3. FIG. 3 is a block diagram illustrating the function of the navigation data converting device 40.

As described above, since the second compass 34 and the second speedometer 36 cannot be directly connected with the LAN 10, they are connected with the LAN 10 through the navigation data converting device 40. The navigation data converting device 40 includes the representative sensor selecting module 44, the serial access modules 46 and 47, the communication control module 48, and the LAN access module 49.

The navigation data converting device 40 always functions as the child unit and, thus, receives the algorithm transmitted from the navigation instrument which functions as the mother unit, and then selects the representative sensor based on the algorithm. The communication control module 48 then transmits the navigation data acquired from the selected representative sensor to the second speedometer 36 (through the LAN access module 49, etc.).

The second speedometer 36 receives the navigation data through the serial access module 87. The function module 82 provided to the second speedometer 36 calculates the ground ship speed by performing suitable processing to the positional information received by the GPS antenna, and displays the ship speed on the display module 81.

In addition, the ground ship speed acquired by the second speedometer 36 is transmitted to the navigation instrument connected with the LAN 10 through the navigation data converting device 40. Similarly, the bow azimuth direction acquired by the second compass 34 is transmitted to the navigation instrument connected with the LAN 10. Thus, by using the navigation data converting device 40, devices which cannot be connected with the LAN can suitably be incorporated into the navigation data sharing system 1.

As described above, in this embodiment, the navigation data sharing system 1 includes the two or more navigation instruments connected with the LAN 10, and the two or more sensors connected with the LAN 10 and for detecting the information to be used by the navigation instruments. Each navigation instrument includes the switch control module 65, the communication control module 68, and the representative sensor selecting module 64. The switch control module 65 switches the function of the navigation instrument concerned between the mother unit and the child unit. The communication control module 68 transmits, when operating as the mother unit, the representative sensor selection related information for selecting the representative sensor, to the child units through the LAN 10. The representative sensor selecting module 64 selects the representative sensor based on the representative sensor selection related information received from the mother unit. Note that only one of the navigation instruments functions as the mother unit.

Thereby, the same navigation data can be used among all the navigation instruments. In addition, since the navigation instrument which functions as the mother unit can be switched, even if a failure occurs to the navigation instrument which is operating as the mother unit, the sharing of navigation data can be maintained by setting another navigation instrument as the mother unit.

In this embodiment, the navigation data sharing system 1 uses the algorithm for selecting the representative sensor as the representative sensor selection related information.

Thereby, since the mother unit and the child units use the navigation data from the same sensor which is selected using the same algorithm, they can share the navigation data. In this case, even when a failure occurs in the connection with the mother unit, the child units can select a suitable sensor by using the latest algorithm which was received from the mother unit previously.

In this embodiment, the navigation data sharing system 1 may use the information that specifies the representative sensor (for example, the ID and/or the IP address) as the representative sensor selection related information.

Thereby, compared with the configuration in which the algorithm itself for selecting the representative sensor is transmitted, the size of the data to be transmitted can be smaller. In addition, since the child unit does not perform the processing for selecting the representative sensor, the computational complexity can be reduced.

In this embodiment, at least two sensors among all the sensors in the navigation data sharing system 1 (for example, the first GPS receiver 31 and the second GPS receiver 32) detect the same physical property.

Thereby, for example, when the detection accuracy of the first GPS receiver 31 which has been used as the representative sensor drops, the representative sensor can be switched to the second GPS receiver 32. Therefore, the system that is extremely stable and excellent in the accuracy of the navigation data used can be achieved.

In this embodiment, when the representative sensor selection related information is updated, the communication control module 68 provided to the navigation instrument which functions as the mother unit in the navigation data sharing system 1 transmits the representative sensor selection related information to the child units.

Thereby, when the setting of the navigation instrument which functions as the mother unit is switched, this switching can be reflected to the child units.

In this embodiment, the navigation data sharing system 1 includes the navigation data converting device 40. The navigation data converting device 40 includes the LAN access module 49, the serial access modules 46 and 47, and the representative sensor selecting module 44. The LAN access module 49 is connected with the LAN 10. The second compass 34 and the second speedometer 36 which cannot directly be connected with the LAN 10 are connected with the serial access modules 46 and 47. The representative sensor selecting module 44 selects the representative sensor to be used by the second speedometer 36 based on the representative sensor selection related information which is received from the mother unit.

Thereby, the second speedometer 36 can use the navigation data from the representative sensor, indirectly through the navigation data converting device 40. The GPS plotter 21, the ECDIS 22, and the radar device 23 can use the bow azimuth direction detected by the second compass 34. Therefore, the second compass 34 and the second speedometer 36 which cannot be connected with the LAN can be incorporated into the navigation data sharing system 1.

In this embodiment, the navigation instrument (the GPS plotter 21, the ECDIS 22, and the radar device 23) includes the switch control module 65, the representative sensor selecting module 64, and the LAN access module 67. The switch control module 65 switches whether the navigation instrument concerned functions as the mother unit or the child unit. The representative sensor selecting module 64 selects the representative sensor. The communication control module 68 transmits the representative sensor selection related information to the child units through the LAN 10.

Thereby, the navigation data which the navigation instrument concerned uses can also be used by other navigation instruments, the second speedometer 36 and the like. Moreover, since the mother unit and the child unit are exchangeable, even if a failure occurs to the navigation instrument concerned, the navigation data sharing system 1 can continue the sharing of the navigation data.

In this embodiment, the navigation instrument selects, when operating as the child unit, the representative sensor based on the transmitted representative sensor selection related information.

Thereby, the same navigation data as that of the mother unit can be used in the child unit.

Although the suitable embodiment of the present invention is described above, the above-mentioned configurations may be changed as follows.

The navigation data sharing system 1 described above is merely an example and, thus, other ship instruments may be connected with the navigation data sharing system 1 in addition or alternative to the navigation instruments and the sensors of this embodiment. For example, the sensor (and the navigation data to be detected) includes a depth meter (depth data) of an echo sounding machine, a water thermometer (water temperature data), an anemometer (wind velocity data), a current meter (current data), and a scanning sonar (detection image data). The sensor may also include an AIS (Automatic Identification System), a turning round angular velocity meter, an autopilot, a rudder control device, a thruster control device, an engine control device, a NAVTEX (Navigation Telex) receiver.

In this embodiment, although the wired LAN is used as the LAN, a wireless LAN may also be used. Moreover, the standard of the LAN to be used may be arbitrary chosen from the known standards of the LAN.

The serial access modules 46 and 47 which the navigation data converting device 40 uses for connecting the LAN and the device which cannot be connected with the LAN may be replaced with suitable access modules which support the type of the device.

The above embodiment may not be limited to the network between the instruments carried in the ship but may be applicable to various kinds of networks, such as networks between instruments carried in an airplane, for example.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A navigation data sharing system, comprising:
    two or more navigation instruments connected with a network of a navigation system; and
    two or more sensors connected with the network and configured to detect information to be used by the navigation instruments;
    each of the navigation instruments comprising:
        a switch control module configured to switch between a state in which the navigation instrument functions as a mother unit and a state in which the navigation instrument functions as a child unit;
        a delivery module configured to transmit through the network, when one of the navigation instruments functions as the mother unit, representative sensor selection related information to another one of the navigation instruments that functions as the child unit, the representative sensor selection related information being a configurable priority which is set in advance to each sensor information and including information about which sensor is to be used as a representative sensor by the mother unit from among the two or more sensors of a sensor group, each of the sensors of the sensor group being configured to detect the same physical property, and only one of the navigation instruments functioning as the mother unit at any given time; and
        a representative sensor selecting module configured to select, when one of the navigation instruments functions as the child unit, the representative sensor from which the child unit is to receive data representative of the physical property, based on the representative sensor selection related information received from the navigation instrument that functions as the mother unit, such that the child unit and the mother unit receive the data from the representative sensor.

2. The navigation data sharing system of claim 1, wherein the navigation instrument uses an algorithm as the representative sensor selection related information to select the sensor to be used.

3. The navigation data sharing system of claim 1, wherein the navigation instrument uses information that specifies the sensor to be used, as the representative sensor selection related information.

4. The navigation data sharing system of claim 1, wherein the delivery module provided to the navigation instrument that functions as the mother unit transmits the representative sensor selection related information to the navigation instrument that functions as the child unit when the representative sensor selection related information is updated.

5. The navigation data sharing system of claim 1, further comprising a navigation data converting device, the navigation data converting device including:
   a first access module connected with the network;
   a second access module connected with the network, the second access module being configured to connect with a device otherwise incapable of communicating with the network and receiving data from the device such that the received data may be transmitted through the network; and
   the representative sensor selecting module configured to select the sensor to be used by a device connected to the second access module, based on the representative sensor selection related information received from the navigation instrument that functions as the mother unit.

6. The navigation data sharing system of claim 1, wherein the navigation instrument is a ship navigation instrument.

7. The navigation data sharing system of claim 1, wherein the representative sensor selecting module selects as the representative sensor the highest priority sensor outputting navigation data.

8. The navigation data sharing system of claim 7, wherein a sensor with the next-highest priority is selected as the representative sensor when navigation data cannot be acquired from the highest priority sensor for more than a predetermined period of time.

9. A navigation instrument which is configured to communicate with an other navigation instrument via a network of a navigation system on a ship, the navigation instrument comprising:
   a switch control module configured to switch between a state in which the navigation instrument functions as a mother unit and a state in which the navigation instrument functions as a child unit;
   a representative sensor selecting module configured to select as a representative sensor one of a plurality of sensors of a sensor group that are connected to the navigation instrument through the navigation system, each of the sensors of the sensor group being configured to detect the same physical property, the representative sensor selecting module selecting the representative sensor from which to receive data representative of the physical property based on representative sensor selection related information that is information about which sensor of the sensor group is to be used, the representative sensor selection related information being a configurable priority which is set in advance to each of the sensors in the sensor group; and
   a delivery module configured to transmit, when the navigation instrument functions as the mother unit, the representative sensor selection related information through the network to the other navigation instrument that functions as the child unit, such that the child unit is controlled, based on the representative sensor section related information, to select the representative sensor from which to receive the data representative of the physical property so that the child unit and the mother unit receive the data from the representative sensor.

10. The navigation instrument of claim 9, wherein the representative sensor selecting module selects the sensor to be used based on the transmitted representative sensor selection related information when the navigation instrument functions as the child unit.

11. The navigation instrument of claim 9, wherein the representative sensor selecting module selects as the representative sensor the highest priority sensor outputting navigation data.

12. The navigation instrument of claim 11, wherein a sensor with the next-highest priority is selected as the representative sensor when navigation data cannot be acquired from the highest priority sensor for more than a predetermined period of time.

13. A method for controlling navigation instrument, comprising:
   configuring the navigation instrument to communicate via a network of a navigation system on a ship to an other navigation instrument;
   operating the navigation instrument as a mother unit and to transmit representative sensor selection related information to the other navigation instruments that operates as a child unit through the network, the representative sensor selection related information being information about which sensor is to be used as a representative sensor among a plurality of sensors of a sensor group connected to the navigation instruments through the network, each of the sensors of the sensor group being configured to detect the same physical property, and the representative sensor selection related information being a configurable priority which is set in advance to each of the sensors in the sensor group; and
   operating the child unit to select, based on the representative sensor selection related information, the representative sensor from which to receive the data representative of the physical property so that the child unit and the mother unit receive the data from the representative sensor.

14. The method of claim 13, wherein the operating one of the navigation instruments as the mother unit includes selecting as the representative sensor to be used which is the highest priority sensor outputting navigation data of the group.

15. The method of claim 14, wherein a sensor with the next-highest priority is selected as the representative sensor when navigation data cannot be acquired from the highest sensor for more than a predetermined period of time.

16. A method for controlling a navigation instrument, comprising:
   configuring the navigation instrument to communicate via a network of a navigation system on a ship to an other navigation instrument;
   operating the navigation instrument as a child unit and to receive representative sensor selection related information from the other navigation instruments that functions as a mother unit through the network, the representative sensor selection related information being information about which sensor is to be used, by the mother unit, as a representative sensor among a plurality of sensors of a sensor group connected to the navigation instruments through the network, each of the sensors of the sensor group being configured to detect the same physical property, and the representative sensor selection related information being a configurable priority which is set in advance to each of the sensors in the sensor group; and operating the child unit to select, based on the representative sensor selection related information, the representative sensor from which to receive the data representative of the physical property so that the child unit and the mother unit receive the data from the representative sensor.

17. The method of claim 16, further comprising selecting as the representative sensor to be used which is the highest priority sensor outputting navigation data of the group.

18. The method of claim 17, wherein a sensor with the next-highest priority is selected as the representative sensor when navigation data cannot be acquired from the highest priority sensor for more than a predetermined period of time.

* * * * *